United States Patent [19]

Gil et al.

[11] Patent Number: 4,989,628

[45] Date of Patent: Feb. 5, 1991

[54] MOISTURE-RESPONSIVE VALVE ASSEMBLY

[75] Inventors: Jacob Gil, 7 Havatselet Str., Kiryat Ono; Zvi Rubinstein, Timrat; Yoram Hadar, Haifa, all of Israel

[73] Assignees: Plastro-Guat, Kibbutz Guat, ; a part interest; Asroteam Consultants Ltd., Migdal Haemek, ; a part interest; Jacob Gil, Kiryat Ono, all of Israel; a part interest

[21] Appl. No.: 479,887

[22] Filed: Feb. 14, 1990

[30] Foreign Application Priority Data

Feb. 17, 1989 [IL]  Israel ......................................... 89317

[51] Int. Cl.⁵ .............................................. A01G 25/00
[52] U.S. Cl. ...................................... 137/78.3; 251/23; 251/32; 239/63
[58] Field of Search ................ 137/78.3, 78.2; 239/63, 239/64; 251/15, 23, 32, 45

[56] References Cited

U.S. PATENT DOCUMENTS

| 1,004,650 | 10/1911 | Hilton | 251/32 |
| 2,421,810 | 6/1947 | Simpson | 251/15 |
| 3,422,833 | 1/1969 | Kitrilakis | 137/78.2 |
| 3,874,590 | 4/1975 | Gibson | 137/78.3 |
| 3,898,843 | 8/1975 | Waterston | 137/78.3 |
| 4,055,200 | 10/1977 | Lohoff | 235/63 |
| 4,214,701 | 7/1980 | Beckman | 239/63 |
| 4,648,555 | 3/1987 | Gumbman, Jr. | 137/78.3 |
| 4,739,789 | 4/1988 | Hamilton | 137/78.3 |

FOREIGN PATENT DOCUMENTS 584826 12/1977 U.S.S.R. ............................. 239/63

Primary Examiner—A. Michael Chambers
Attorney, Agent, or Firm—Benjamin J. Barish

[57] ABSTRACT

A moisture-responsive valve assembly includes a housing having a moisture-swellable body to swell in volume in response to soil moisture, and a bi-stable snap-action device for controlling the valve in response to the volume of the moisture-swellable body. The valve assembly further includes a damped delay mechanism effective to close the valve after it has been open for a predetermined period of time.

15 Claims, 3 Drawing Sheets

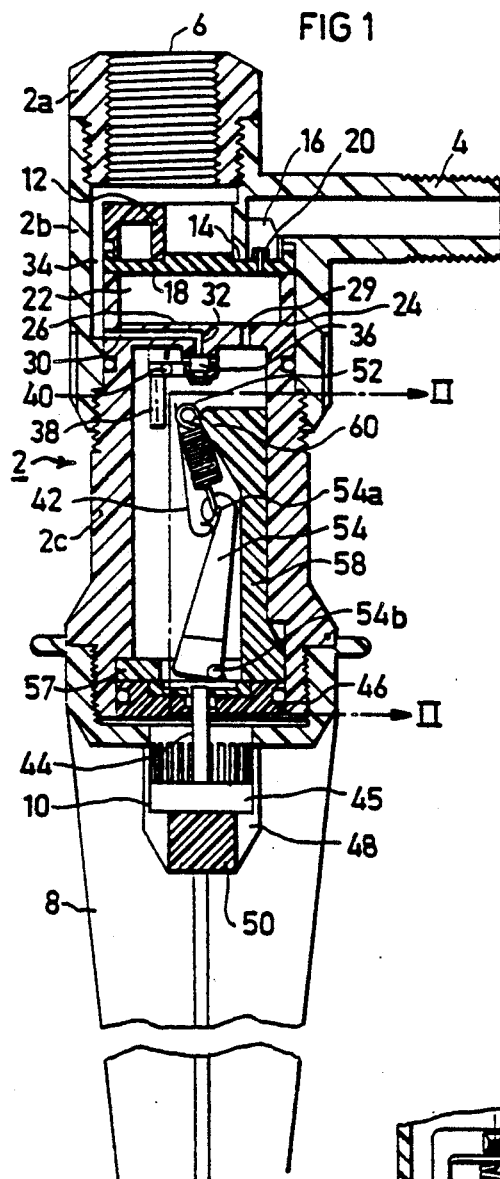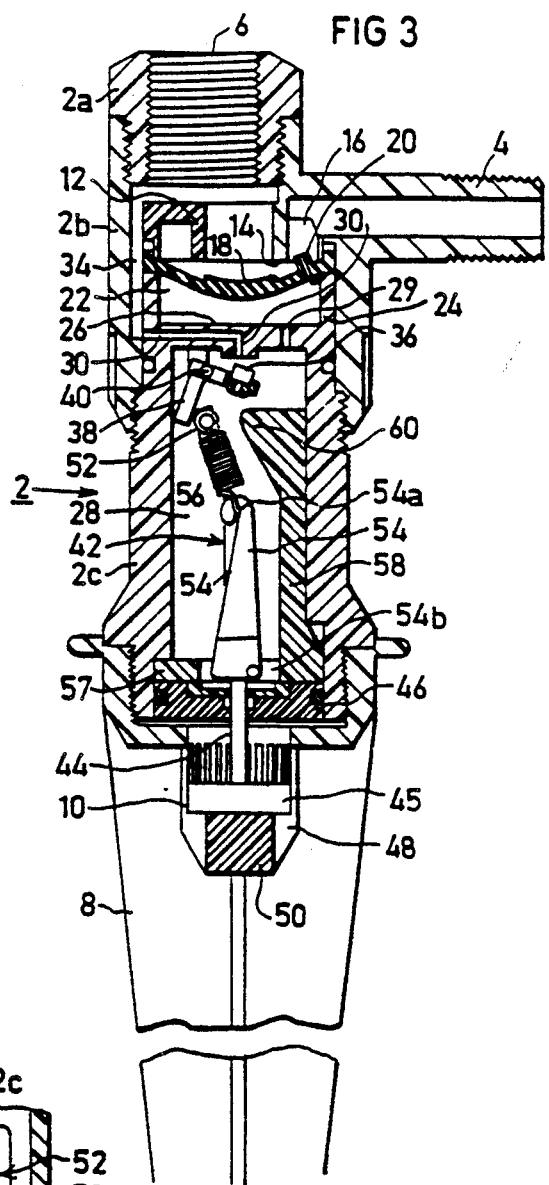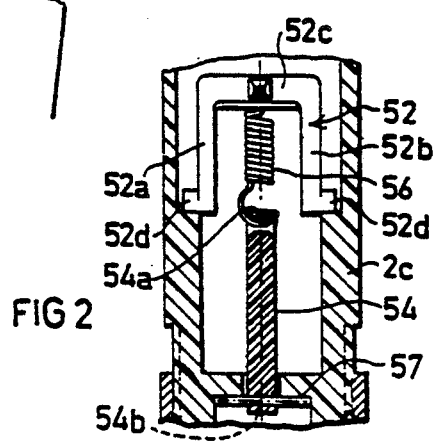

MOISTURE-RESPONSIVE VALVE ASSEMBLY

BACKGROUND OF THE INVENTION

The present invention relates to a moisture-responsive valve assembly for controlling the flow of a liquid in response to moisture. The invention is particularly applicable as a moisture-responsive valve in a water irrigation system for controlling the flow of the irrigation water to the irrigating devices, such as drip-irrigation emitters, in response to the moisture content of the soil; therefore, the invention is described below with respect to this application.

In the conventional water-irrigation system, all the irrigating devices for a particular plot of land are generally turned on for a specified time period, or after a specified quantity of water has been dispensed, and then all are turned off. Such a system tends to supply the same quantity of water to all the irrigating devices, irrespective of the moisture content of the soil at the individual locations of the irrigating devices. This results in a wastage of water since some locations receive more water than required particularly if the system is designed so that no location receives less water than required. Moreover, such systems require either manual control for turning-on and turning-off the water irrigation devices according to the desired time intervals or quantities of water dispensed, or automatic control equipment for performing these functions.

A number of moisture-responsive valves have been developed for controlling the water supplied to the irrigating devices in response to the moisture content of the soil. In most of such known systems, however, the moisture-responsive valve may partially open and assume a stable state of remaining partially open by the continuous discharge of a small quantity of water, thereby disabling it from its normal control function. In one known device as illustrated in U.S. Pat. No. 3,747,399, the valve opens with a snap-action, but does not close with a snap-action, and therefore the valve in that device may also remain in a partially-open position. Moreover, such a device, as well as many of the other known devices, are of relatively complicated structures which are costly to produce and to maintain.

OBJECTS AND SUMMARY OF THE INVENTION

An object of the present invention is to provide a moisture-responsive valve having advantages in the above respects.

Another object of the invention is to provide an assembly including a moisture-responsive valve and an outlet valve including a damped delay mechanism for limiting the period of time in which the valve is in its open condition after having been opened by the moisture-responsive mechanism.

According to the present invention, there is provided a moisture-responsive valve comprising a housing including an inlet port for connection to a water supply pipe, an outlet port, a passageway connecting the inlet port to the outlet port, a valve opening in the passageway, and a displaceable valve member actuatable to open and close the valve opening. The housing further includes a moisture-pervious wall, a moisture-swellable body in communication with the moisture-pervious wall to swell in volume in response to the moisture passing through the wall and absorbed by the body, and actuator means controlled by the moisture-swellable body for actuating the valve member to open and close the valve in response to the moisture passing through the moisture-pervious wall. The actuator means includes a control chamber connected to the inlet port so as to receive the pressure thereat. The valve member is located with respect to the control chamber and the inlet port such that the pressure at the inlet port acts against a portion of the surface area of the valve member in the direction tending to open it, whereas the pressure in the control chamber acts against a larger portion of the surface area of the valve member in the opposite direction tending to close it when the pressure in the control chamber is equal to that at the inlet port. The moisture-responsive valve further includes venting means for venting the control chamber to the atmosphere; and a bi-stable snap-action device interposed between the moisture-swellable body and the valve member to actuate the valve member in response to the volume of the moisture-swellable body.

The arrangement is such that when the volume of the moisture-swellable body is low, the snap-action device opens the venting means to actuate the valve member to its open condition and to stably retain it in its open condition, and when the volume of the moisture-swellable body is high, the snap-action device closes the venting means to actuate the valve member to its closed condition and to stably retain it in its closed condition.

It will thus be seen that a valve constructed in accordance with the foregoing features both opens and closes with a snap-action, thereby preventing the valve from remaining in a partially-open condition.

According to further features in a described embodiment of the invention, the assembly further includes an outlet valve controlled by a damped delay mechanism effective, when the valve member of the moisture-responsive valve is actuated to its open condition, to close and thereby to terminate the flow via the outlet valve after the moisture-responsive valve has been in its open condition for a predetermined period of time.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of moisture-responsive valve constructed in accordance with the invention, the valve being illustrated in its closed condition;

FIG. 2 is a sectional view along line II—II of FIG. 1;

FIG. 3 is a view similar to that of FIG. 1 but illustrating the valve in its open condition;

DESCRIPTION OF PREFERRED EMBODIMENTS

The Embodiment of FIGS. 1-3

Figure 4:
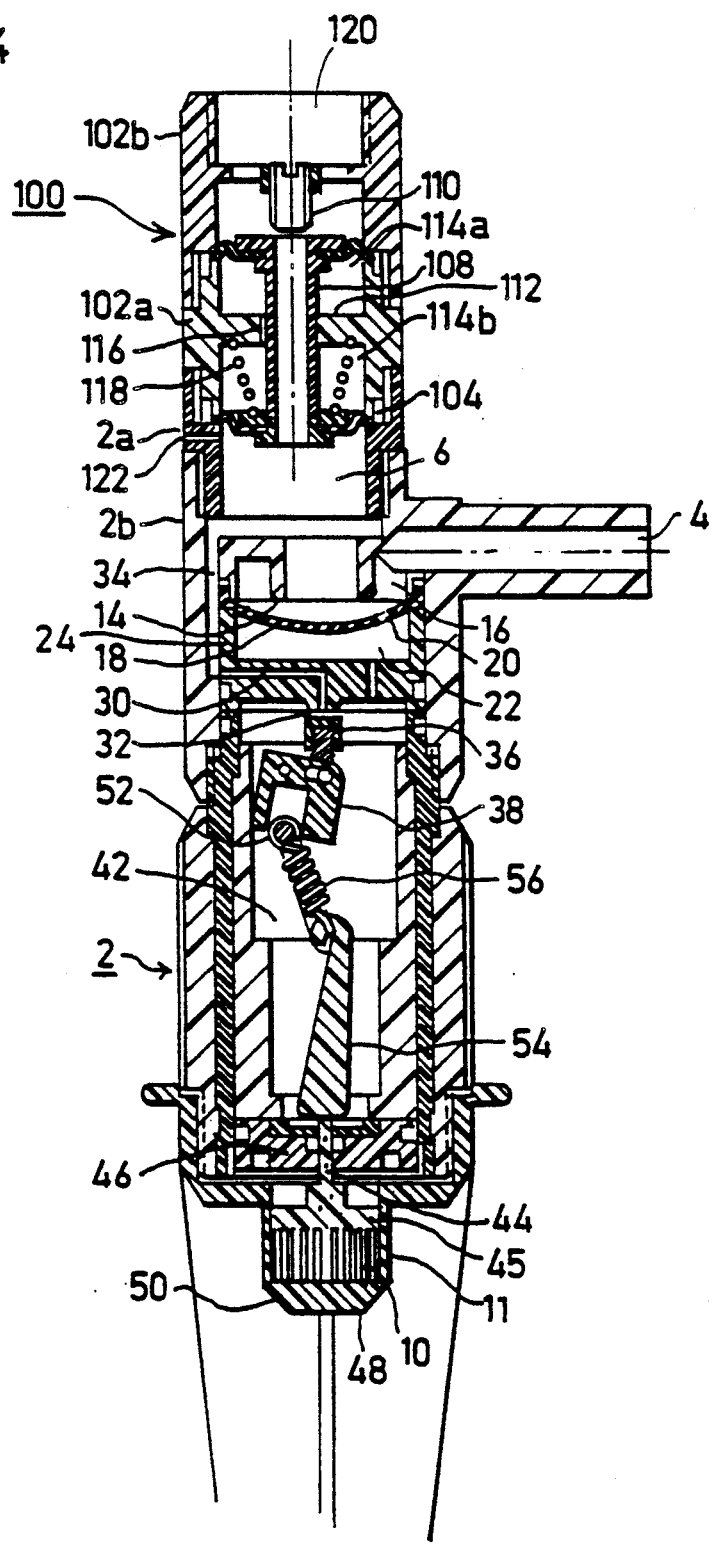
FIG. 4 is a longitudinal sectional view illustrating a valve assembly, including the moisture-responsive valve of FIGS. 1-3 and a damped delay mechanism at the outlet end of the valve, the latter mechanism being in its open condition.

The valve illustrated in the drawings comprises a housing, generally designated 2, including an inlet port 4 for connection to a water supply pipe, and an outlet port 6 for connection to a water distribution device, such as a water sprinkler, drip irrigation emitter line, or the like. The device is illustrated as being carried by a ground stake 8 insertable into the ground such that a moisture-wellable body 10 disposed within housing 2 senses the moisture in the ground and controls the operation of the valve within the housing.

Housing 2 is constituted of three sections 2a, 2b, 2c, and the ground stake 8, all threadedly attached together.

Housing section 2a is formed with the outlet port 6 and is threadly attached to housing section 2b which is formed with the inlet port 4. Housing section 2b is further formed with a cylindrical sleeve 12 serving as a valve opening 14 in a passageway 16 connecting the inlet port 4 to the outlet port 6.

A diaphragm 18 is clamped between housing sections 2b and 2c, when the two sections are attached together, and serves as a displaceable valve member cooperable with valve opening 14 to control the flow of the water from the inlet port 4 through passageway 16 to the outlet port 6. Diaphragm 18 is formed with a small passageway 20 adjacent its outer edge, i.e., outwardly of valve opening 14. Passageway 20 transmits, at a slow rate, the inlet pressure to a chamber 22 at the opposite side of diaphragm 18 formed between the diaphragm and a cylindrical sleeve 24 of housing section 2c. Sleeve 24 is of larger diameter than, and coaxial with, cylindrical sleeve 12 of housing section 2b. Chamber 22 serves as a control chamber for controlling the displacement of diaphragm 18 as will be described more particularly below.

Housing section 2c is formed with a partition wall 26 separating control chamber 22 from another chamber 28 at the opposite side of the partition. Wall 26 is formed with a further passageway 29 for transmitting the pressure control chamber 22 to chamber 28.

Wall 26 of housing section 2c is formed with a further passageway 30 extending from a port 32 through a passageway 34, defined by a recess formed in the inner face of housing section 2b, to the outlet port 6. Port 32 serves as a venting port for venting the interior of chamber 28 via passageways 30 and 34 to the outlet port 6. Since chamber 28 is also connected via passageway 29 to the control chamber 22, the pressure in the latter chamber is also vented by the same venting port 32 to the outlet port 6.

Venting port 32 is controlled by a closure member 36 secured at one end of a bell crank lever 38 pivotally mounted at 40 to housing section 2c. Normally, closure member 36 is urged to close venting port 32 (as shown in FIG. 1) by the pressure within chamber 28, but may be actuated to its open position (shown in FIG. 3) by a bi-stable snap-action mechanism, generally designated 42, disposed within chamber 28. Mechanism 42 is in turn controlled by the moisture-swellable body 10 via an actuator pin 44 interposed between body 10 and mechanism 42.

The ground stake 8, which serves as part of housing 2 enclosing the moisture-swellable body 10, is threadedly attached to the lower end of housing section 2c. The latter section is closed by a wall 46 formed with a central opening for receiving an actuator pin 44 carried by a piston (not shown) within the housing for the moisture-swellable body. The moisture-swellable body 10 is disposed within a socket 48 formed in the upper end of ground stake 8 and is raised above the bottom of the socket by a foot 50 of smaller area than the moisture-swellable body 10, such that when the ground stake 8 is attached to housing section 2c and is embedded in the soil, a moisture-pervious wall is formed exposing the moisture-swellable body 10 to the moisture within the soil.

It will be appreciated that the volume of moisture-swellable body 10 increases when the soil is wet, and decreases when the soil is dry. This change in volume of the moisture-swellable body 10 is transmitted via actuator pin 44 to the bi-stable snap-action mechanism 42, to control the position of diaphragm valve 18 with respect to the valve opening 14, as will be described more particularly below.

The structure of the bi-stable snap-action mechanism 42 is more particularly illustrated in FIG. 2. Thus, it includes a first link 52 and a second link 54 interconnected by a spring 56. As shown particularly in FIG. 2, link 52 is in the form of a bail having a pair of parallel legs 52a, 52b connected together by an intermediate leg 52c. The ends of the two parallel legs 52a, 52b are pivotally mounted at 52d to the housing section 2c. Spring 56 is connected to the intermediate leg 52c, and to the upper end of the second link 54, as shown at 54a, the opposite end of link 54 being pivotally mounted, as shown at 54b, to a disc 57 closing the end of housing section 2c. Disc 57 is formed with an upstanding rib 58 terminating at its upper end in a shoulder 60 aligned with intermediate leg 52c of bail 52, and serves as a stop for the bail when the snap-action mechanism 42 is in the valve-closed position as illustrated in FIG. 1

The illustrated moisture-responsive valve operates as follows:

When the soil is moist, the moisture-swellable body 10 will be of larger volume thereby moving the actuator pin 44 to a raised position (FIG. 1). Actuator pin 44, being non-aligned with pivotal mounting 54b of link 54, pivots the link clockwise, whereupon the upper end of link 54 pivots bail 52 also clockwise to the position illustrated in FIG. 1, i.e., spaced from lever 38 and resting against stop 60 within chamber 28 of the housing.

Since the upper end, i.e., intermediate arm 52c, of bail 52 is spaced from lever 38, the closure member 36 at the opposite end of the lever will be urged to its closed position against venting port 32. This is because the pressure in chamber 28 at one side of the closure member is greater than the outlet pressure 6 at the opposite side of the closure member. That is to say, the pressure in chamber 28 at one side of the closure member will be at or approach the pressure at the inlet 4 because of passageways 20 and 29 establishing communication between chamber 28 and the inlet 4; whereas the pressure at the opposite side of the closure member 36 will be at or near the outlet pressure 6 because of passages 30 and 34 establishing communication between the venting port 32 and the outlet 6.

When venting port 32 is closed by closure member 36, the pressure within the control chamber 22 will increase to that at the inlet port 4 because of passageway 20. This inlet pressure in chamber 22 acts against the complete surface of diaphragm valve 18 exposed to chamber 22. Since the opposite of the diaphragm valve is exposed to the outlet pressure 6 (atmospheric), the pressure within chamber 22 will move diaphragm valve 18 to its closed position against valve opening 14, thereby terminating the flow of water from the inlet port to the outlet port 6.

Now, as the soil tends to lose moisture, the moisture-swellable body 10 senses the soil moisture content and thereby decreases in volume. This lowers the actuator pin 44, which tends to pivot link 54 counter-clockwise about its pivotal mounting 54b. When the upper end 54a of link 54 passes the center line between pivotal mounting 54b of link 54 and the connection of spring 36 to the intermediate leg 52c of link 52, the spring will pivot link 52 counter-clockwise with a snap-action, to the position illustrated in FIG. 3, bringing intermediate leg 52c of link 52 into contact with lever 38, to pivot the lever clockwise about its pivotal mounting 40, and thereby to move closure member 36 away from the venting port 32. When this occurs, the pressure within chamber 28 is vented to the atmosphere via passageways 30 and 34 leading to the outlet port 6 thereby causing the pressure within chamber 28 to drop. This drop in pressure in chamber 28 is communicated via passageway 29 to control chamber 22, thereby causing the pressure in that chamber also to drop towards atmospheric pressure. The inlet pressure, applied to the outer margin of the diaphragm valve 18 is now not offset by the pressure within control chamber 22, so this inner pressure moves the valve member away from valve opening 14, thereby opening the flow of water from the inlet 4 to the outlet 6.

It will thus be seen that the above-described mechanism 42, which acts against closure member 36 to open or close venting port 32, provides a bi-stable snap-action control for opening and closing the valve and for assuring that the valve member will stably remain in its closed condition until the soil moisture dries sufficiently, and then will be actuated to stably maintain the valve in its open condition until the soil is moistened to a predetermined condition.

Figure 5:
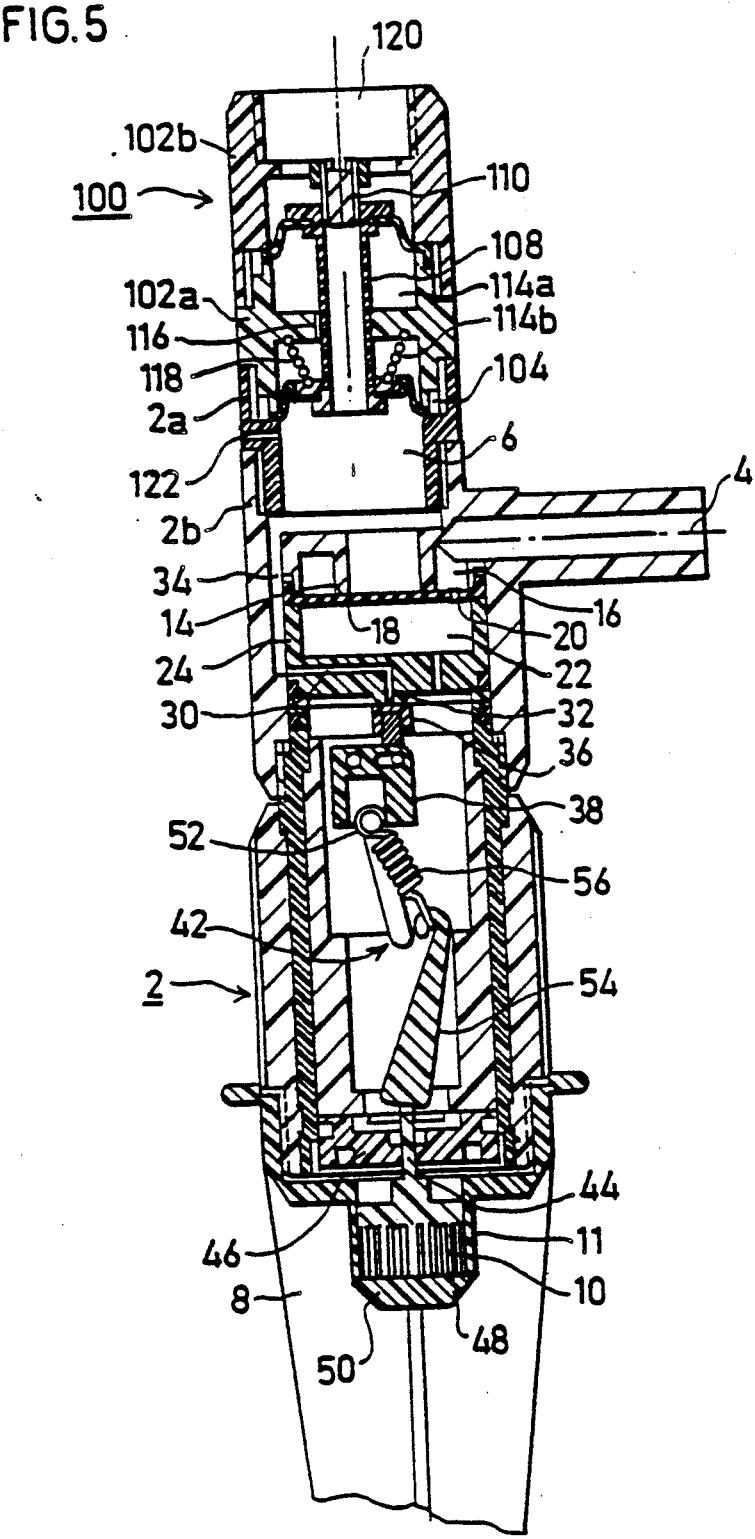
FIG. 5 is a view similar to that of FIG. 4 but showing the outlet valve in its closed condition.

Embodiment of FIGS. 4 and 5

FIGS. 4 and 5 illustrate a valve assembly including the moisture-responsive valve of FIGS. 1–3 together with an outlet valve controlled by a damped delay mechanism effective, when the valve member of the moisture-responsive valve is actuated to its open condition, to close and thereby to terminate the flow via the outlet valve after the elapse of a predetermined time interval. Since the moisture-responsive valve illustrated in FIGS. 4 and 5 is basically of the same construction as in FIGS. 1–3 above, the elements are identified by the same reference numerals to facilitate understanding of its structure and operation.

The remainder of the description will be directed to the structure and operation of the outlet valve and its damped delay control mechanism, both generally designated 100, connected to the outlet port 6 of the moisture-responsive valve.

Thus, the outlet valve assembly 100 comprises two housing sections 102a, 102b. Housing section 102a is threadedly attached to housing section 2a of the moisture-responsive valve, and housing section 102b is threadedly attached to housing section 102a.

A first rolling diaphragm 104 is attached between housing sections 2a and 102a, and a second rolling diaphragm 106 is attached between housing sections 102a and 102b. The two diaphragms floatingly mount a hollow stem 108 such as to permit some axial movement of the stem. One end of the hollow stem 108 communicates with the outlet chamber of the outlet port 6. The opposite end of hollow stem 108 is aligned with, but normally spaced a slight distance from a pin 110 fixed to housing section 102b.

Housing section 102a further includes a partition 112 dividing the space between the housing section and the hollow sleeve 108 into two chambers 114a, 114b. Both chambers are filled with an oil, such as a silicon oil, and a small passageway 116 is formed in partition 112 to provide communication between the two chambers. Chamber 114b includes a spring 118 which is normally effective to urge hollow stem 108 away from the fixed pin 110.

It will thus be seen that when diaphragm 18 of the moisture-responsive valve has been opened because of the sensed dry condition of the soil, water will flow via inlet 4, through the chamber of the outlet port 6, through the hollow stem 108, and out through the outlet 120 since the hollow stem is normally spaced from the fixed pin 110. However, the pressure within the outlet chamber 6 tends to move the hollow stem 108 towards the fixed pin 110, the movement being damped by the flow of oil from chamber 114b to chamber 114a via passageway 116. After a predetermined time interval, as determined by the above damping action, hollow stem 108 engages fixed pin 110, thereby terminating the flow through the outlet 120, even though the moisture-responsive valve is still in its open condition.

The termination of the flow through the outlet 120 by the movement of stem 108 against the fixed pin 110, will cause a build-up of pressure to occur in the outlet chamber 6. However, that chamber is provided with a venting orifice 122 to relieve the pressure until diaphgragm 18 is moved to its closed position against valve opening 12 by the sensing of sufficient moisture in the ground.

While the invention has been described with respect to two preferred embodiments, it will be appreciated that many other variations, modifications and applications may be made.

What is claimed is:

1. A moisture-responsive valve, comprising:
   a housing including an inlet port for connection to a water supply pipe, an outlet port, a passageway connecting the inlet port to the outlet port, a valve opening in said passageway, and a displaceable valve member actuatable to open and close said valve opening;
   said housing further including a moisture-pervious wall, a moisture-swellable body in communication with said moisture-pervious wall to swell in volume in response to the moisture passing therethrough, actuator means controlled by said moisture-swellable body for actuating said valve member to open and close the valve in response to the moisture passing through said moisture-pervious wall;
   said actuator means including a control chamber connected to the inlet port so as to receive the pressure thereat;
   said valve member being located with respect to said control chamber and said inlet port such that the pressure at the inlet port acts against a portion of the surface area of the valve member in the direction tending to open it, whereas the pressure in the control chamber acts against a larger portion of the surface area of the valve member in the opposite direction tending to close it when the pressure in the control chamber is equal to that at the inlet port;

venting means for venting said control chamber to the atmosphere;

and a bi-stable snap-action device interposed between said moisture-swellable body and said valve member to actuate said valve member in response to the volume of said moisture swellable body, such that when the volume of the moisture-swellable body is low, the snap-action device opens said venting means to actuate the valve member to its open condition and to stably retain it in its open condition, and when the volume of the moisture-swellable body is high, the snap-action device closes said venting means to actuate said valve member to its closed condition and to stably retain it in its closed condition.

2. The device according to claim 1, wherein said bi-stable snap-action device comprises:

a first link pivotally mounted at one end to the housing;

a spring having one end attached to the opposite end of said first link;

a second link having one end connected to the opposite end of the spring, the opposite end of the second link being pivotally mounted to the housing;

and a coupling between the moisture-swellable body and said opposite end of the second link and effective, in response to an increase in volume of the moisture-swellable body, to move said first link with a snap-action to a first stable position wherein said venting means is closed thereby moving said valve member to its closed position, and in response to a decrease in volume of the moisture-swellable body, to move the second link with a snap-action to a second stable position opening said venting means and thereby moving said valve member to its open position.

3. The valve according to claim 2, wherein said first link is a bail having a pair of parallel legs connected together by an intermediate leg, the outer ends of said parallel legs being pivotally mounted to the housing, and said one end of the spring being attached to said intermediate leg of the bail.

4. The valve according to claim 3, wherein said second link is a lever having one end attached to said opposite end of the spring, the opposite end of the lever being pivotally mounted to the housing.

5. The valve according to claim 3, wherein said coupling comprises an actuator pin interposed between the moisture-swellable body and said opposite end of the second lever.

6. The valve according to claim 1, wherein said control chamber is connected via a small passageway to a second chamber in which said bi-stable snap-action device is located, said venting means including a venting port in said second chamber, and a closure member in said second chamber for opening and closing said venting port 7. The valve according to claim 1, wherein said valve member comprises a diaphragm having at one side a larger surface exposed to the pressure in the control chamber, and at the opposite side a large surface exposed to the outlet pressure, and a small surface exposed to the inlet pressure when the valve is closed.

8. The valve according to claim 7, wherein said smaller surface exposed to the inlet pressure when the valve is closed is around the periphery of the diaphragm.

9. The valve according to claim 1, further including a ground stake for insertion into the ground with the moisture-swellable body in communication with the ground moisture via said moisture-pervious wall.

10. A valve assembly including a moisture-responsive valve according to claim 1, wherein said outlet port includes an outlet valve controlled by a damped delay mechanism effective, when said valve member of the moisture-responsive valve is actuated to its open condition, to close and thereby to terminate the flow via said outlet valve after the moisture-responsive valve has been in its open condition for a predetermined period of time.

11. The valve assembly according to claim 10, wherein said housing includes an outlet chamber communicating with said outlet port of the moisture-responsive valve; and wherein said outlet valve comprises: a fixed pin fixed to the housing on the outlet side of said outlet valve; and a hollow stem supported between a pair of diaphragms, with one end of the stem communicating with said outlet chamber of the moisture-responsive valve and the opposite end aligned with, but normally spaced from, said fixed pin and controlled by said damped delay mechanism to engage said fixed pin after the moisture responsive valve has been in its open condition for a predetermined period of time.

12. The valve assembly according to claim 11, wherein said damped delay mechanism comprises: a portion of the housing enclosing said hollow stem; a partition dividing the space between said portion of the housing and hollow stem into two chambers; a small passageway connecting said two chambers; oil filling both said chambers; and a spring in one of said chambers urging said hollow stem to its open condition with respect to said fixed pin.

13. A valve assembly comprising:

a moisture-responsive valve, including a housing having an inlet port for connection to a water supply pipe, an outlet port, a passageway connecting the inlet port to the outlet port, a valve opening in said passageway, and a displaceable valve member actuatable to open and close said valve opening;

said housing including a moisture-pervious wall, a moisture-swellable body in communication with said moisture pervious wall to swell in volume in response to the moisture passing therethrough, and actuator means controlled by said moisture-swellable body for actuating said valve member to open and close the valve in response to the moisture passing through said moisture-pervious wall;

and an outlet valve controlled by a damped delay mechanism effective, when said valve member of the moisture-responsive valve is actuated to its open condition, to close, and thereby to terminate the flow via said outlet valve, after the moisture-responsive valve has been in its open condition for a predetermined period of time.

14. The valve assembly according to claim 13, wherein said housing includes an outlet chamber communicating with said outlet port of the moisture-responsive valve; and wherein said outlet valve comprises: a fixed pin fixed to the housing on the outlet side of said outlet valve; and a hollow stem supported between a pair of diaphragms, with one end of the stem communicating with said outlet chamber of the moisture-responsive valve and the opposite end aligned with, but normally spaced from, said fixed pin and controlled by said damped delay mechanism to engage said fixed pin after the moisture-responsive valve has been in its open condition for a predetermined period of time.

15. The valve assembly according to claim 14, wherein said damped delay mechanism comprises: a portion of the housing enclosing said hollow stem; a partition dividing the space between said portion of the housing and hollow stem into two chambers; a small passageway connecting said two chambers; oil filling both said chambers; and a spring in one of said chambers urging said hollow stem to its open condition with respect to said fixed pin.

* * * * *

UNITED STATES PATENT AND TRADEMARK OFFICE
CERTIFICATE OF CORRECTION

PATENT NO. : 4,989,628
DATED : February 5, 1991
INVENTOR(S) : Gil, et al

It is certified that error appears in the above-indentified patent and that said Letters Patent is hereby corrected as shown below:

On the title page, Item [30] Foreign Application Priority Data, please add —February 2, 1990 (IL) Israel 93526—.

Signed and Sealed this

Fourteenth Day of December, 1993

Attest:

BRUCE LEHMAN

Attesting Officer

Commissioner of Patents and Trademarks